May 7, 1935. G. T. SCHRODER 2,000,193
INSECT TRAP
Filed March 1, 1929

INVENTOR
George T. Schroder
BY
ATTORNEY

Patented May 7, 1935

2,000,193

UNITED STATES PATENT OFFICE 2,000,193

INSECT TRAP

George T. Schroder, New York, N. Y.

Application March 1, 1929, Serial No. 343,782

6 Claims. (Cl. 43—121)

This invention relates to insect traps, and more particularly to traps for roaches, croton bugs and the like, which traps are characterized by having primarily a screen ventilated top, a plurality of insect entrances of such form as to partially conform to the shape of an insect's body so as to permit ready ingress of such insects but greatly confuse and hinder such insects in attempting to escape, and being also provided with an interiorly arranged bait cup which may be baited without opening the trap.

The main object of my invention is to provide a trap of the character indicated which is extremely efficient in trapping obnoxious insects by so constructing the trap that a full view of the interior, especially of the bait within may be had by the insect when crawling over the top, and also as direct access to the odor of the bait and the interior of the trap without entering the same.

Another feature of my invention is to make the outer wall of the trap round or endless, so that insects will not be discouraged from hunting entrances into the trap by having to turn any sharp corners, and also including a plurality of inwardly pointed funnel entrances of novel form in said endless wall.

A further feature is to have a bait cup within the bottom of the trap which may be baited by merely pouring a small amount of milk or other liquid food through the top into the cup which may be either a relatively small member fastened to the bottom of the trap, or may be made of glass and itself constitute the bottom.

Above all, it is also an object to so construct the trap of inexpensive materials as to render it very cheap and economical to use, and likewise to proportion and arrange the various parts of the whole so that the entire assembly becomes inviting to insects and certain to retain them when once caught.

Further objects and the various novel features and advantages of my invention will become more apparent as this specification proceeds.

After very much experiment and investigation, I have found that there are several things which must simultaneously be taken into consideration when it is desired to trap roaches, water bugs and the like. First, these bugs, in fact, all insects are more or less suspicious and crafty; then they have certain very decided likes and aversions relative to certain materials and structures, as well as to various imposed conditions of light and shade and the like. Among their likes may be mentioned their general liking for paper, glass, and dull colored iron of gray shades, while on the other hand, they seem to abhor bright and shining metallic surfaces if avoidable. They also like to crawl through constricted cracks and such limited openings, especially when the same appear to lead to bait of attractive kind.

Full advantage of such mentioned characteristics and others as well has been taken, and the same combined in the novel and highly efficient trap described herein and illustrated in the accompanying drawing, in which, Fig. 1 is a perspective view of a trap made according to the main principles of my invention and embodying the same in practical form.

Throughout the views, the same reference numerals indicate the same or duplicate parts.

Figure 2:
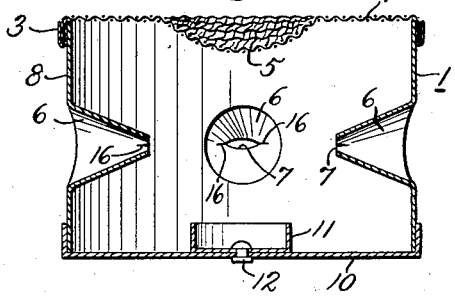
Fig. 2 is vertical cross section of the same for the purpose of disclosing the interior construction.

In the practice of my invention, a trap, generally indicated at 1 has a round or endless wall 8 resting on a bottom indicated by 10, the latter being retained in assembly by the flange 9. The trap has a screen top 4 which is preferably bounded by an enveloping band 3 of metal or any other suitable material. The trap proper may be made of paper, fiber or any other useful material, the same being true of the bottom. In the wall of the trap at 8, a plurality of somewhat conical and inwardly directed entrance members 6, 6, are arranged, being either formed integral with the wall as part thereof, or made with a flange upon each as at 15 in Fig. 4, whereby to secure the members on the wall. However, the form of these entrance members is an exceedingly important part of my invention, for no part of such member should present any hint to a trapped insect where to find an exit. For this as well as other reasons, the inner ends of the entrance members are flattened while being somewhat oval in form and narrowed at the ends of the openings, so that each opening will present approximately the same general form as the cross section of the body of a roach or bug. It is clear that when an insect creeps into one of the entrances, the latter by its very form will focus all attention toward the small opening 7 thereof which will seem to the insect to be of just the proper size and form to constitute a fine entrance by which to reach the bait within, but the moment such insect has entered, the opening looks so insignificant as to blend into the surroundings, and is, for all practical purposes, forever lost to view, being thus, actually part of an optical illusion. It is my experience that no full grown roach ever escapes from such an opening which just comfortably allows it to enter. This is also due to the relatively short projection of the member 6 by which entrance is had, hence all crawling within the trap is done over or under the members 6, 6 and around the wall 8, but not generally out upon the entrance members. The travel is thus more or less in line with the horizontal or longer dimensions of the openings, and rarely up and down across them, and they are therefore unnoticed. As insects are usually very strong, this fact may also be used to advantage by further reducing the size of the openings 7, 7 and slitting up the sides of the entrance members 6, 6, as indicated at 16, in Figs. 2 and 4 in order to allow the opening to be sprung slightly apart by the insect upon entering, and thus more effectively retaining the same, the entrance member springing back into shape upon passage of the insect.

Upon the bottom of the trap which is preferably removable for discharging trapped insects, a bait cup 11 is secured by means of a rivet 12, or by any other suitable means, the most easily used effective bait being milk. In order to eliminate the necessity for opening the trap and possibly losing insects already trapped, the screen top 4 may be depressed as at 5, this construction permitting small amounts of liquid bait to be poured through several of the apertures of the screen top into the cup below, as the depression will cause the liquid to unerringly gravitate toward the cup, for the depression is arranged to be located directly above the bait cup for this purpose.

The screen top may be permanently secured to the trap wall 8, if so desired, but I prefer to make it in the form of a removable screen cover as shown, due to its ready manufacture in this form. The screen can also be continued down to form the wall 8, as this would also be practical. However, it is often desirable to have the entrance funnels integral with the wall 8 of the trap, especially when made of imperforate material such as paper or the like, in order to avoid joints or apparent obstructions for the insects.

Owing to the fact that insects are readily attracted by bait which is visible, it may also be desirable to make the bottom of the trap of glass or other transparent material as indicated at 19, the upper portion of the same at 14 preferably extending up into the wall 8 so that the latter may rest upon a flange or rim 13. Milk or other liquid contained in such a transparent bottom would immediately arouse the desire in an insect to enter the trap, the result being often that small insects drown when trapped.

Figure 1:
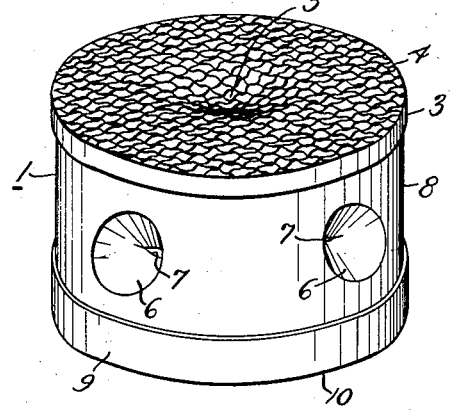
Figure 4:
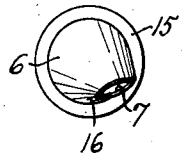
Fig. 4 is a perspective view of one of the insect entrance funnels to further show its construction and possible means of fastening the same to the wall of the trap.
Figure 5:
Fig. 5 is a perspective view of a modification of the part shown in Fig. 4.
Figure 6:
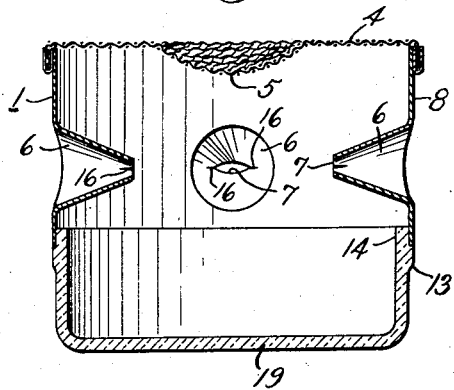
Fig. 6 is another modification of the same part.
Figure 3:
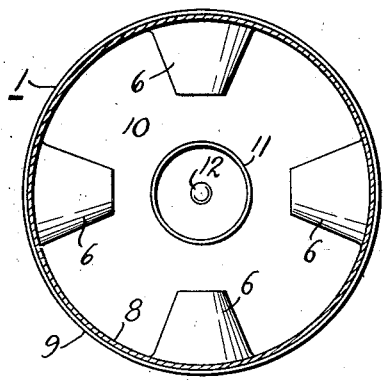
Fig. 3 is a top plan view of the same trap with the screen cover removed to clarify the view.

The entrance member may be slightly modified, as shown at 17 in Fig. 5 where the smaller end or opening 18 is formed somewhat like a diamond form, the same principle being present as before as in the case of openings 7, 7. Another slight modification is shown in Fig. 4 wherein the entrance member has a rim or flange 15 by which it may be attached to the trap wall.

Various modifications such as those indicated may be made while retaining the main features of my invention without departing from the spirit and scope thereof.

Having thus fully described my invention, I claim:

1. In an insect trap of the type having walls forming an enclosure and adapted to retain bait, an entrance member for insects comprising a funnel shaped member having an elongated opening at the inner end with the major axis of the opening adapted to extend in a horizontal direction, and the sides of said member adjacent to the ends of said axis being slit toward the other end of the member.

2. In an insect trap of the type having walls forming an enclosure and adapted to retain bait, an entrance member for insects comprising a funnel shaped member having an elongated opening at the inner end with the major axis of the opening adapted to extend in a horizontal direction, and the sides of the opening meeting to form acute angles having their respective apexes at the extremities of said major axis.

3. In an insect trap of the type having walls forming an enclosure and adapted to retain bait, an entrance member for insects comprising a funnel shaped member having an elongated opening at the inner end with the major axis of the opening adapted to extend in a horizontal direction, the sides of the opening meeting to form acute angles having their respective apexes at the extremities of said major axis, and the sides of said member being slit at the apexes of said angles.

4. In an insect trap of the type having walls forming an enclosure and adapted to retain bait, an entrance member for insects comprising a funnel shaped member having an elongated opening at the inner end with the major axis of the opening adapted to extend in a horizontal direction, the sides of said member adjacent to the ends of said axis being slit toward the other end of the member, a bottom, a cup secured to the bottom and having a vertical wall the surface of which is inwardly disposed of the inner end of the funnel shaped member, and a screen forming an upper closure, said screen having a depressed portion, the upper edge of which has a periphery disposed inwardly of the inner end of the funnel shaped member whereby, when liquid bait is poured on the screen at substantially the center thereof it will be directed into said cup.

5. An insect trap comprising a member having walls and a bottom, said walls including one or more funnel shaped members, each of which has an opening at the inner end with the major axis of the opening adapted to extend in a horizontal direction and the sides of which adjacent to the ends of said axis are slit towards the other end of the member; and a top, the latter consisting of a perforated member having a central depressed portion the outer boundaries of which are inwardly disposed with respect to the inner ends of the funnel shaped members, and a container of substantially the same width dimension as the depressed portion positioned beneath said depressed portion, whereby when liquid bait is poured on the perforated member at substantially the center thereof it will be directed into said container.

6. An insect trap comprising a member having walls and a bottom, said walls including one or more funnel shaped members, each of which has an opening at the inner end with the major axis of the opening adapted to extend in a horizontal direction and the sides of which adjacent to the ends of said axis are slit towards the other end of the member, and a top, the latter consisting of a perforated member having a central depressed portion the outer boundaries of which are inwardly disposed with respect to the inner ends of the funnel shaped members and positioned directly above a central portion of the bottom whereby liquid bait poured on the depressed portion will be directed toward the central portion of the bottom.

GEORGE T. SCHRODER.